(12) United States Patent
Perkinson

(10) Patent No.: US 8,172,530 B2
(45) Date of Patent: May 8, 2012

(54) PITCH CHANGE ACTUATION SYSTEM FOR A COUNTER-ROTATING PROPELLER

(75) Inventor: Robert H. Perkinson, Somers, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 539 days.

(21) Appl. No.: 12/481,500

(22) Filed: Jun. 9, 2009

(65) Prior Publication Data

US 2010/0310369 A1    Dec. 9, 2010

(51) Int. Cl.
*B64C 27/10* (2006.01)
(52) U.S. Cl. .................... 416/1; 416/128; 416/157 R
(58) Field of Classification Search ............... 416/1, 46, 416/104, 115, 124, 127, 128, 129, 130, 147, 416/156, 157 R, 157 B
See application file for complete search history.

(56) References Cited

U.S. PATENT DOCUMENTS

| 2,601,090 | A | * | 6/1952 | Burwell ................ 416/115 |
| 4,523,891 | A | | 6/1985 | Schwartz et al. |
| 4,533,296 | A | | 8/1985 | Duchesneau et al. |
| 4,810,164 | A | | 3/1989 | Wright |
| 4,934,901 | A | | 6/1990 | Duchesneau |
| 4,936,746 | A | * | 6/1990 | Mayo et al. ................ 416/46 |
| 5,042,966 | A | | 8/1991 | Schwartz et al. |
| 5,174,718 | A | | 12/1992 | Lampeter et al. |
| 6,077,040 | A | | 6/2000 | Pruden et al. |
| 6,261,062 | B1 | | 7/2001 | Amerline et al. |
| 6,422,816 | B1 | | 7/2002 | Danielson |
| 6,592,328 | B1 | | 7/2003 | Cahill |
| 6,811,376 | B2 | | 11/2004 | Arel et al. |
| 6,991,426 | B2 | | 1/2006 | Pietricola |
| 7,118,340 | B2 | * | 10/2006 | D'Anna ...................... 416/1 |

* cited by examiner

*Primary Examiner* — Igor Kershteyn
(74) *Attorney, Agent, or Firm* — Kinney & Lange, P.A.

(57) ABSTRACT

A system for adjusting the pitch of a counter-rotating propeller has a propeller shaft, a forward propeller driven by the propeller shaft, and an aft propeller connected with the forward propeller. The forward propeller has a hub, blades mounted within the hub, and an actuator connected with an end of the blades. The aft propeller has a hub, blades mounted within the hub, and a cam assembly connected with an end of the blades. The actuator of the forward propeller has a forward end and an aft end, wherein the aft end is connected with the cam assembly of the aft propeller. Thus, when the actuator moves in an axial direction, the cam assembly moves relative to the actuator and the pitch of the forward propeller blades and the pitch of the aft propeller blades are simultaneously adjusted.

20 Claims, 4 Drawing Sheets

PITCH CHANGE ACTUATION SYSTEM FOR A COUNTER-ROTATING PROPELLER

CROSS-REFERENCE TO RELATED APPLICATION(S)

This is a related application to U.S. patent application Ser. No. 12/481,495, filed on Jun. 9, 2009, entitled "Electrical System for Driving a Propeller Pitch Change Mechanism."

BACKGROUND

Counter-rotating propellers have two propeller assemblies (a forward assembly and an aft assembly) that operate so that the propeller blades rotate in opposite directions to provide greater efficiency for the propeller. In order to increase or decrease the speed of the propeller, the pitch of the propeller blades can be adjusted. Changing the pitch of these blades requires communication of either an actuation power system or control signals across the interface between a non-rotating side of the propeller (e.g., the airframe or engine) and the rotating side of the propeller (e.g., the propeller assemblies). Counter-rotating propellers provide at least two challenges for changing the pitch of the blades. First, in order to transmit power and control from the non-rotating side of the propeller to the propeller assemblies, very complex, heavy and unreliable actuation systems are required. The second challenge is providing a means for actuating the pitch of the forward propeller assembly and the aft propeller assembly concurrently, which requires crossing additional rotating boundaries. This has previously been done by using multiple pitch change actuators, typically one for each rotor. In order to overcome these and other challenges, pitch change actuation systems for counter-rotating propellers have required very complex systems with multiple components.

Counter-rotating propellers are generally rotated by a high speed gas turbine engine with the propeller rotors placed in tandem either in front (tractor) or behind the engine (pusher). In general, it is convenient to provide gear reduction to more closely match the optimal rotation speeds of the rotors and the engine. It is also convenient to use a planetary type gear train to drive the rotors in opposite directions. The planetary gearbox may be placed between the engine and first rotor or between the first and second rotor as is well known in the art. It also becomes evident that communication between the rotating propellers and the non-rotating engine case must also pass through the gearbox.

SUMMARY

The present invention is a system for adjusting the pitch of counter-rotating propellers. A propeller shaft drives a forward propeller having a hub and a plurality of blades mounted within the hub. The hub of the forward propeller also has an actuator connected with an end of the blades. An aft propeller is connected with the forward propeller, the aft propeller having a hub, a plurality of blades mounted within the hub, and a cam assembly within the hub that is connected with an end of the blades. The actuator has a forward end and an aft end, wherein the aft end is connected with the cam assembly of the aft propeller with a suitable mechanism to permit the differential rotation of the aft propeller hub and the forward propeller hub. Thus, when the actuator moves in an axial direction, the cam assembly moves relative to the actuator, and the pitch of the forward propeller blades and the pitch of the aft propeller blades are simultaneously yet separately adjusted.

In another aspect of the invention, a method for adjusting the pitch of counter-rotating propellers includes driving a propeller shaft to rotate a forward propeller in a first rotational direction and an aft propeller in a second rotational direction, wherein the forward propeller has a hub, blades, and an actuator connected with the forward propeller blades and the aft propeller has a hub, blades, and a cam assembly connected with the aft propeller blades. Moving the actuator (which is connected with a cam assembly at the aft end of the actuator) in a first axial direction moves the cam assembly in the first axial direction to simultaneously decrease the pitch of the blades of the forward propeller and the pitch of the blades of the aft propeller. Moving the actuator in a second axial direction moves the cam assembly in the second axial direction to simultaneously increase the pitch of the blades of the forward propeller and the pitch of the blades of the aft propeller.

DETAILED DESCRIPTION

Figure 1:
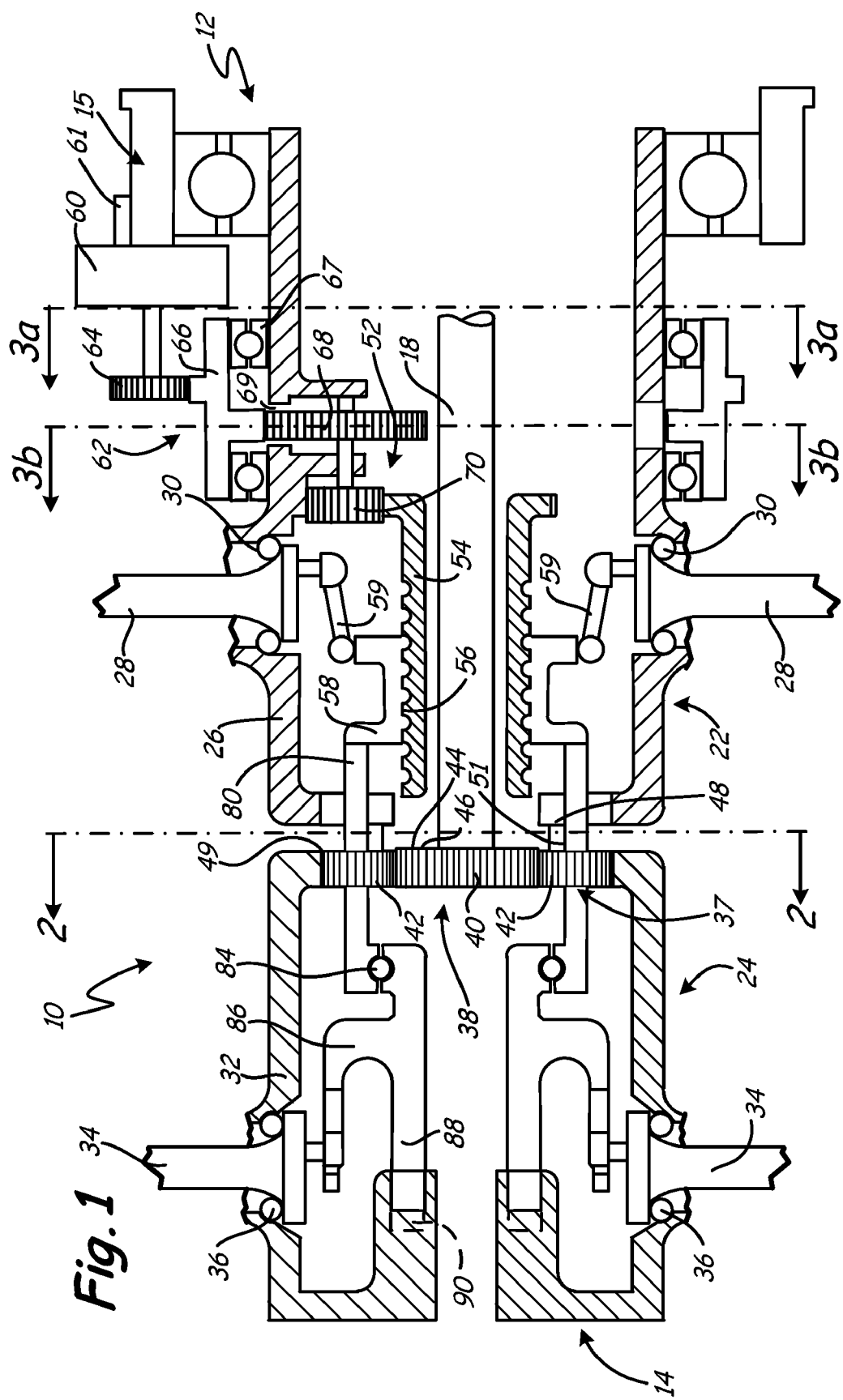
FIG. 1 is a cross-sectional view of the invention used in a counter-rotating propeller.

In the embodiment shown in FIG. 1, propeller system 10 includes non-rotating side 12 and rotating side 14. Non-rotating side 12 has stationary components that include an engine 15 that provides rotational input to propeller system 10. Rotating side 14 includes propeller shaft 18, forward propeller assembly 22, and aft propeller assembly 24. The rotational input from engine 15 allows propeller shaft 18 to rotate propeller assemblies 22, 24. Forward propeller assembly 22 has hub 26 and a plurality of blades 28 (only two are shown in FIG. 1) mounted to hub 26 on bearings 30. Aft propeller assembly 24 also has hub 32 and a plurality of blades 34 (only two are shown in FIG. 1) mounted to hub 32 on bearings 36.

An actuation system 37 connects forward propeller assembly 22 with aft propeller assembly 24 such that the pitch of blades 28 of forward propeller assembly 22 is adjusted relative to the pitch of blades 34 of aft propeller assembly 24. Because this is a counter-rotating propeller system, aft propeller assembly 24 must rotate in the opposite direction of forward propeller assembly 22. This complicates the ability of the actuation system 37 to simultaneously adjust the pitch of blades 28 of forward propeller assembly 22 and the pitch of blades 34 of aft propeller assembly 24 when forward propeller assembly 22 and aft propeller assembly 24 are rotating in opposite directions. The mechanism used to counter-rotate forward propeller assembly 22 and aft propeller assembly 24 will be discussed first, followed by a discussion of actuation system 37.

Figure 2:
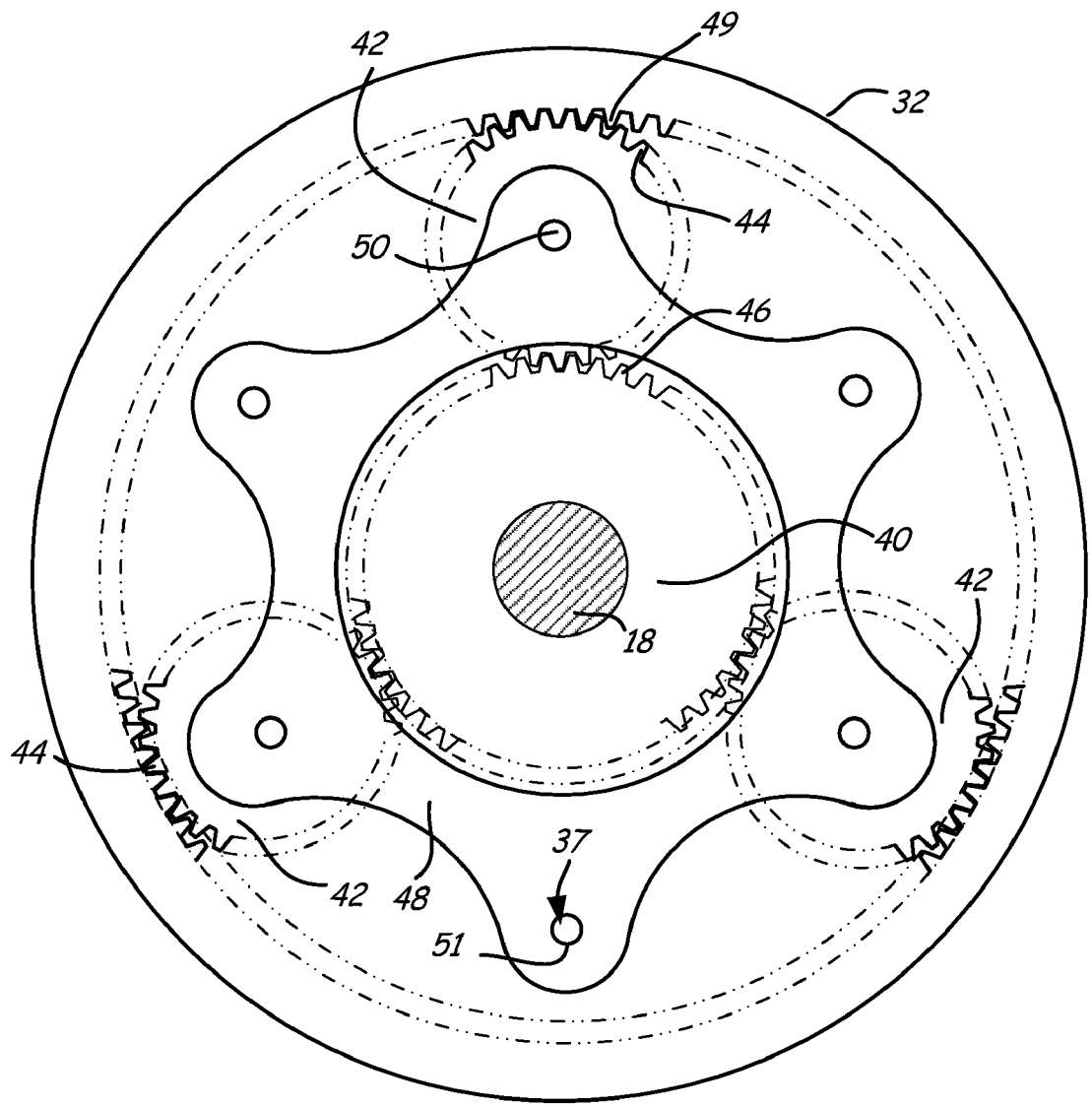
FIG. 2 is a plan of a typical gear system used to connect the forward propeller assembly and the aft propeller assembly taken along line 2-2 of FIG. 1.

Although it can be appreciated that there are several ways to rotate aft propeller assembly 24 in the opposite direction of forward propeller assembly 22, the illustrative embodiment shown in FIG. 1 uses planetary gear system 38. Planetary gear system 38 has sun gear 40 mounted on propeller shaft 18 that rotates in the direction of propeller shaft 18, and planet gears 42 that mesh with teeth on sun gear 40. Planet gears 42 thus rotate as sun gear 40 rotates. FIG. 2 shows planetary gear system 38 in more detail. As shown in FIG. 2, at least three planet gears 42 surround sun gear 40 and have teeth 44 that mate with teeth 46 on sun gear 40. Hub 32 of aft propeller assembly 24 has inward-facing teeth 49 that mate with teeth 44 on planet gears 42. Planet gears 42 are interconnected by planet gear carrier 48, and each planet gear 42 is connected to planet gear carrier 48 at connection 50. Planet gear carrier 48 also has holes 51 to allow actuation system 37 to communicate between forward propeller assembly 22 and aft assembly 24, which will be discussed in further detail below. Planet gear carrier 48 may be of any shape or configuration as long as it is able to interconnect planet gears 42 and allow actuation system 37 to communicate between the forward propeller assembly 22 and aft propeller assembly 24.

As a result of the rotational input provided by engine 15, propeller shaft 18 (rotating in a positive direction) rotates hub 26 of forward propeller assembly 22 (and thereby also rotates blades 28) in a positive direction. Propeller shaft 18 also rotates sun gear 40 in a positive direction, which rotates planet gears 42 in a negative direction. Because the teeth of planet gears 42 are mated with teeth on hub 32, hub 32 (and blades 34) also rotates in the negative direction. This allows aft propeller assembly 24 to rotate in the negative direction while forward propeller assembly 22 rotates in the positive direction to create the counter-rotating motion.

Because planetary gear system 38 connects propeller assemblies 22, 24 so that they rotate with each other, the torque applied to forward propeller assembly 22 will be proportional to the torque applied to aft propeller assembly 24 depending on the gear ratio of planetary gear system 38. The rotational speeds of forward propeller assembly 22 and aft propeller assembly 24 are affected by the power absorbed as a result of the pitch of the propeller blades 28, 34. Also, the sum of the rotational speeds of the propeller assemblies 22, 24 must be proportional to the rotational speed of shaft 18. Therefore, the rotational speed of forward propeller assembly 22 will not necessarily be equal to the rotational speed of aft propeller assembly 24. While having forward propeller assembly 22 and aft propeller assembly 24 operating at different rotational speeds may seem problematic, it has been discovered that there is a noise benefit for rotating forward propeller assembly 22 at a slightly different speed than the aft propeller assembly 24. Counter-rotating propellers are known to be noisy, and when the forward propeller assembly 22 is rotated at a slightly different speed than the aft propeller assembly 24, the noise level decreases. For example, if forward propeller assembly 22 is running at 1000 RPM, there is a noise benefit for running aft propeller assembly 24 at a speed between 850 RPM and 1250 RPM, or a difference of up to 15% of the speed of forward propeller assembly 22.

Referring again to FIG. 1, actuation system 37 connects forward propeller assembly 22 with aft propeller assembly 24 such that, as forward propeller assembly 22 rotates in the opposite direction of aft propeller assembly 24, the pitch of blades 28 of forward propeller assembly 22 is able to be adjusted simultaneously with the pitch of blades 34 of aft propeller assembly 24. Actuation system 37 includes actuator 52, which is located within hub 26 of forward propeller assembly 22. Actuator 52 is similar to the actuator described in related application Ser. No. 12/481,495 filed the same day as this application. In the present invention, however, actuator 52 is also capable of adjusting the pitch of a second set of blades 34 that are located on aft propeller assembly 24 as it rotates in the opposite direction of the rotation of forward propeller assembly 22.

Although other types of actuation systems would work (including those described in related application Ser. No. 12/481 495), actuator 52 includes ball screw 54 (which has threaded portion 56) and nut 58 that translates along threaded portion 56 as ball screw 54 is rotated in a given direction. Nut 58 connects to an end of blade 28 so that when nut 58 translates along threaded portion 56, blades 28 rotate to adjust pitch. In the embodiment shown, nut 58 is connected to ends of blades 28 (only one shown in FIG. 1) with link connection 59 (only one shown in FIG. 1). When nut 58 is urged in a first axial direction, blades 28 rotate in a first rotational direction and the pitch of blades 28 is decreased. When nut 58 is urged in a second axial direction, blades 28 rotate in a second rotational direction and the pitch of blades 28 is increased.

In order to rotate ball screw 54 and change the pitch of blades 28, motor 60 is used to drive gear train 62 that is connected to ball screw 54. Although any type of motor could be used, motor 60 is a permanent magnet DC motor. Other types of motors, such as AC motors or hydraulic motors, would also be acceptable. Shaft 61, which is rotated by motor 60, drives a gear train 62 that is connected to ball screw 54. Gear train 62 has pinion 64, ring gear 66, intermediate gear 68, and gear 70 that meshes with teeth on ball screw 54.

Figure 3A:
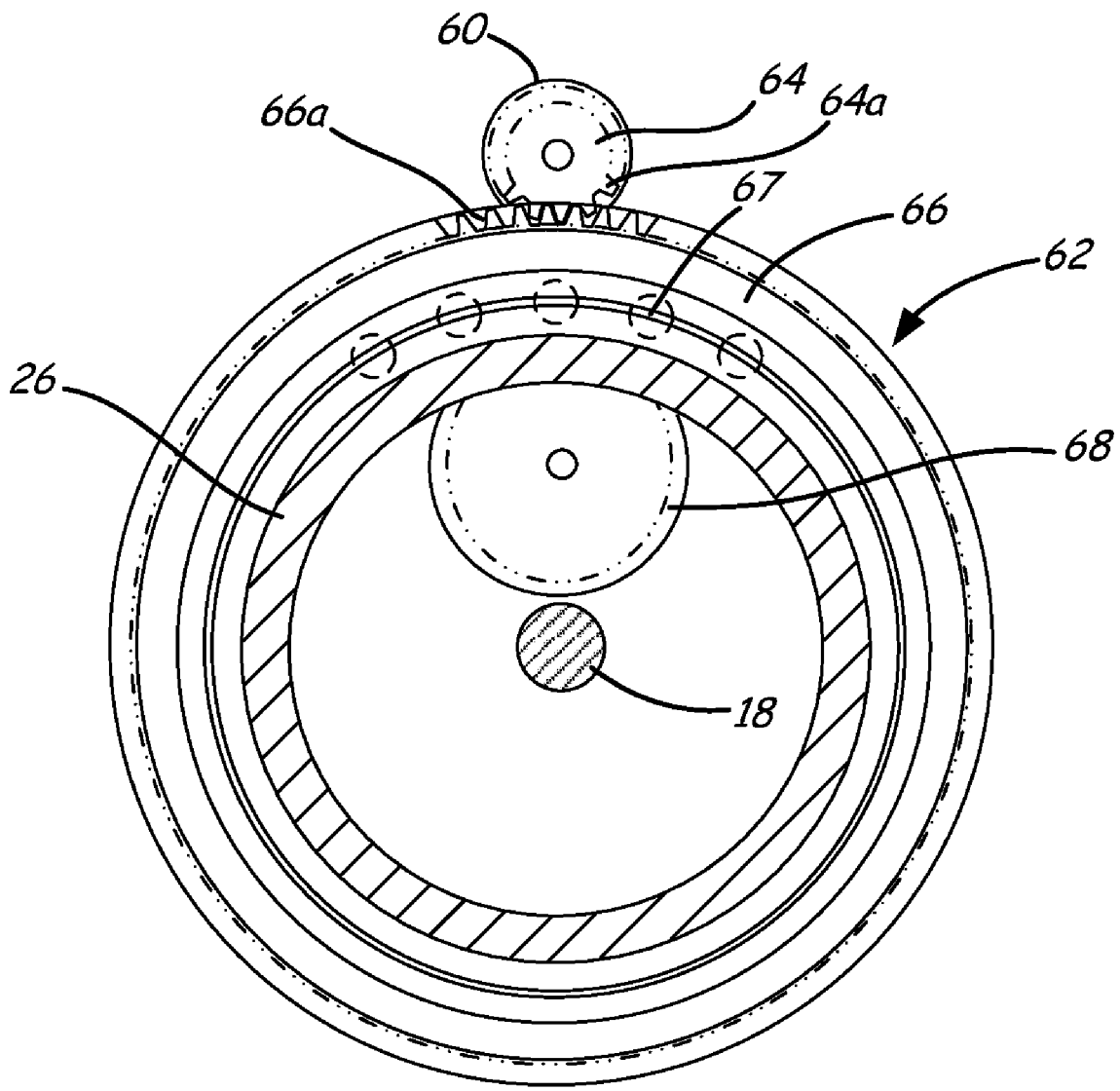
FIG. 3a is a plan view of the motor and gear assembly taken along line 3a-3a of FIG. 1.
Figure 3B:
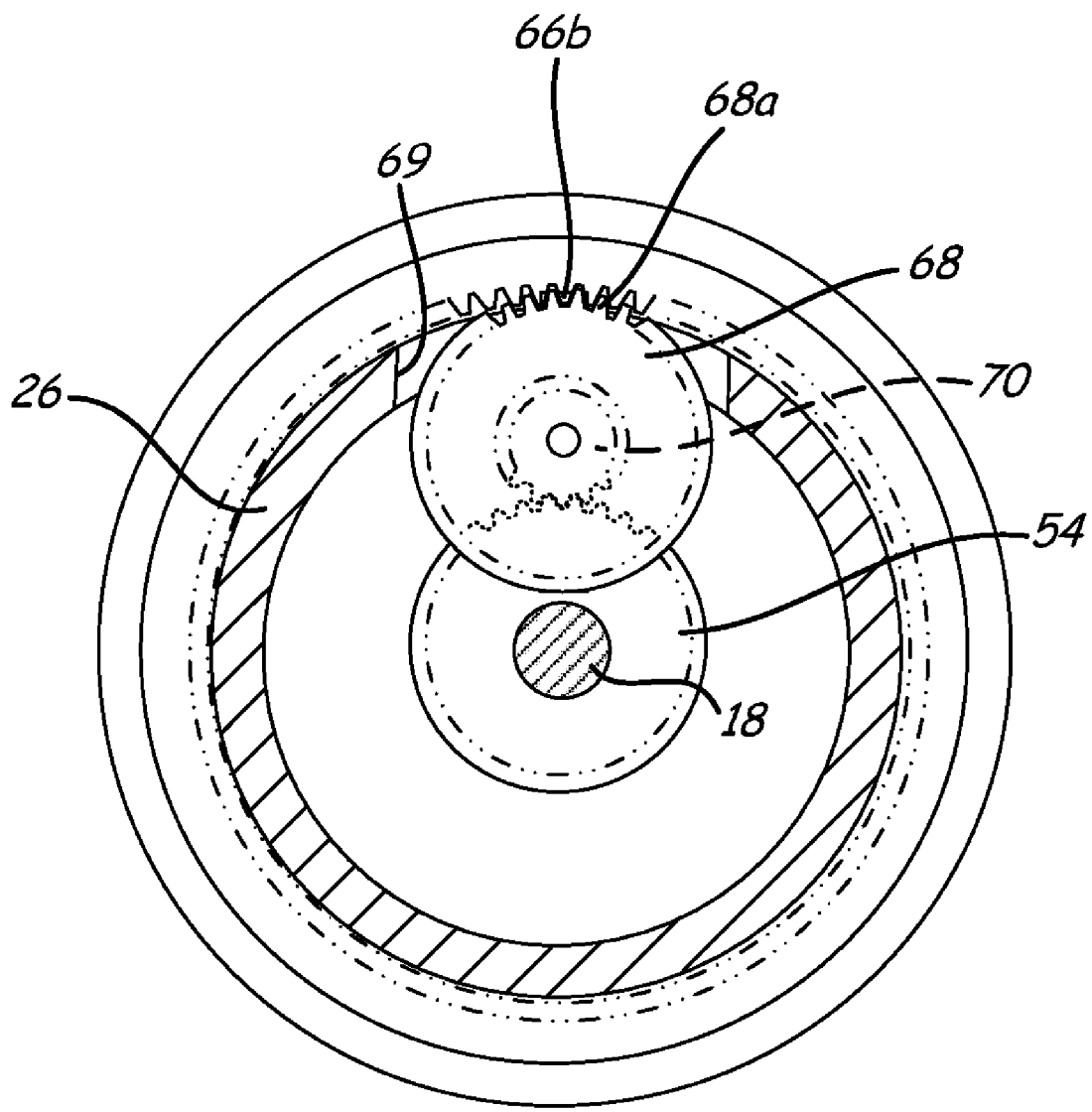
FIG. 3b is a plan view of the forward propeller assembly taken along line 3b-3b of FIG. 1.

FIGS. 3a and 3b show gear train 62 in further detail. Pinion 64 is driven by motor 60. As shown in FIG. 3a, teeth 64a on pinion 64 mesh with teeth 66a on an outer surface of ring gear 66. Ring gear 66 surrounds hub 26 and is supported by bearings 67. As motor 60 drives pinion 64 at a given input speed, ring gear 66 rotates proportionally with pinion 64. FIG. 3b shows intermediate gear 68 located within cutout 69 in hub 26. Teeth 68a on intermediate gear 68 mesh with the teeth 64b on inner surface of ring gear 66. Intermediate gear 68 is connected with gear 70 by a shaft 71, and gear 70 has teeth (shown in phantom) that mesh with teeth (shown in phantom) on ball screw 54. As ring gear 66 (driven by pinion 64) rotates intermediate gear 68, intermediate gear 68 drives gear 70 connected with ball screw 54, which surrounds propeller shaft 18. Therefore, pinion 64 rotates at an input speed provided by motor 60, ring gear 66 rotates proportionally with pinion 64, intermediate gear 68 rotates proportionally with ring gear 66, and gear 70 rotates proportionally with intermediate gear 68 to rotate ball screw 54.

Referring again to FIG. 1, when motor 60 rotates at the speed it takes to keep gear 70 from rotating ball screw 54, the pitch of blades 28 does not change. As shown in FIG. 1, when the rotational speed of pitch change motor 60 increases, gear train 62 turns gear 70, which rotates threaded portion 56 of ball screw 54 and nut 58 moves in a first axial direction. Link connection 59 connects nut 58 at the ends of blades 28 connected. When nut 58 is moved in the first axial direction, blades 28 rotate in a first rotational direction and the pitch of blades 28 decreases. The rotational speed of blades 28 thus increases. When the rotational speed of pitch change motor 60 decreases, gear train 62 turns gear 70 at a slower rate and rotates threaded portion 56 of ball screw 54 so that nut 58 moves in the second axial direction. When nut 58 is moved in the second axial direction, blades 28 rotate in a second rotational direction and the pitch of blades 28 increases. The rotational speed of blades 28 thus decreases.

In order to use one actuator 52 to simultaneously adjust the pitch of blades 28 on forward propeller assembly 22 and the pitch of blades 34 on aft propeller assembly 24, nut 58 has push-rod 80 at the aft end of nut 58. Push-rod 80 extends axially towards the aft propeller assembly 24 through holes 51 in planet gear carrier 48 and is mounted in bearings 84 with cam assembly 86. Cam assembly 86 has a cam extension 88, which is received by a slot 90 in aft propeller hub 32. Cam assembly 86 is also connected with blades 34 (only two are shown in FIG. 1) by pin and bearing assembly 92 (only two are shown in FIG. 1).

When nut 58 moves in a first axial direction, push rod 80 moves in the first axial direction, shifting cam assembly 86 in a first axial direction. Specifically, cam extension 88 moves in a first axial direction in slot 90. As cam assembly 86 moves in the first axial direction, pin and bearing assembly 92 rotates blade 34 in a first rotational direction. The pitch of blade 34 decreases and the rotational speed of blades 34 increases. Because push rod 80 is connected to nut 58, this change in pitch of blades 34 occurs simultaneously with the change in pitch of blades 28, which rotate in a first rotational direction to decrease the pitch and increase the rotational speed of blades 28 as nut 58 moves in the first axial direction. When nut 58 moves in a second axial direction, push rod 80 moves in the second axial direction, shifting cam assembly 86 in the second axial direction. Specifically, cam extension 88 in the second axial direction in slot 90. As cam assembly 86 moves in the second axial direction, pin and bearing assembly 92 rotates blades 34 in a second rotational direction. The pitch of blades 34 increases and the rotational speed of blades 34 decreases. This also occurs simultaneously with blades 28, which rotates in a second rotational direction to increase the pitch and decrease the rotational speed of blades 28.

Cam assembly 86 permits the incorporation of a non-linearity, in the form of a cam profile, in the relative blade angles of blades 28, 34. The blade angle of blades 34 will be a function of the blade angle of blades 28. The variations available in the selection of the cam profile to be machined on cam assembly 86 permits the exploitation of performance differences between forward propeller assembly 22 and aft propeller assembly 24. This may be used to more closely match the rotational speeds of forward propeller assembly 22 and aft propeller assembly 24 for a specific set of operating conditions.

While only one type of actuation system is described herein, other types of actuation systems, including hydraulic systems and other mechanical systems, may be used as long as the actuator allows the simultaneous adjustment of the pitch of blades 28 on forward propeller assembly 22 and the pitch of blades 34 on aft propeller assembly 24 by axially displacing a member in forward propeller assembly 22 relative to the axial displacement of a member in aft propeller assembly 24. Also, with respect to gear train 62 used in actuation system 37, other gear trains may also be used, such as a stationary differential gear train where a motor 60 drives a pinion gear, which is directly meshed with an intermediate gear and therefore does not require a ring gear.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for adjusting pitch of a counter-rotating propeller, the system comprising:
   a propeller shaft;
   a forward propeller driven by the propeller shaft, the forward propeller having a forward hub, forward propeller blades mounted within the forward hub; and
   an aft propeller connected with the forward propeller, the aft propeller having an aft hub, aft propeller blades connected to the aft hub, and a cam assembly within the aft hub connected with an end of the aft propeller blades; and
   an actuator within the forward hub connected with an end of the forward propeller blades, the actuator having a forward end and an aft end, wherein the aft end is connected with the cam assembly and, when the actuator moves in an axial direction, the pitch of the forward propeller blades and the pitch of the aft propeller blades are adjusted simultaneously.

2. The system of claim 1, wherein when the actuator moves in a first axial direction, the cam assembly moves in the first axial direction, and the pitch of the forward propeller blades and the pitch of the aft propeller blades decrease; and when the actuator moves in a second axial direction, the cam assembly moves in the second axial direction, and the pitch of the forward propeller blades and the pitch of the aft propeller blades increase.

3. The system of claim 1, wherein the aft propeller is connected with the forward propeller assembly with a gear system that allows the forward propeller assembly to rotate in a first direction while the aft propeller assembly rotates in a second direction.

4. The system of claim 3, wherein the forward propeller assembly rotates at a first speed and the aft propeller assembly rotates at a second speed.

5. The system of claim 4, wherein the second speed is between about 85% and 115% of the first speed.

6. The system of claim 3, wherein the gear system is a planetary gear system having a sun gear mounted to the propeller shaft.

7. The system of claim 1, the cam assembly comprising:
   a push-rod for connecting the cam assembly to the aft end of the actuator.

8. The system of claim 1, the cam assembly comprising:
   a slot; and
   a cam, wherein when the actuator moves in the axial direction, the cam moves in the axial direction in the slot.

9. The system of claim 1, wherein the actuator is selected from the group consisting of mechanical actuators and hydraulic actuators.

10. The system of claim 9, wherein the actuator is a mechanical actuator.

11. The system of claim 10, wherein the actuator is a nut of a ball screw having a threaded portion that rotates to move the nut in the axial direction.

12. The system of claim 11, and further comprising:
   a motor; and
   a gear train having a pinion gear driven by the motor and a gear mounted on a first end of the ball screw for rotating the threaded portion of the ball screw.

13. The system of claim 11, wherein the nut has a push-rod connected at an end of the nut near the aft propeller assembly.

14. A system for adjusting pitch of a counter-rotating propeller, the system comprising:
   a propeller shaft;
   a forward propeller driven by the propeller shaft and rotating in a first direction, the forward propeller comprising:
      a forward hub; and
      forward propeller blades mounted within the forward hub;
   an actuator within the forward hub connected with an end of the forward propeller blades;

an aft propeller driven by a gear train having a gear mounted to the propeller shaft, the aft propeller rotating in a second direction and comprising:
an aft hub; and
aft propeller blades connected to the aft hub;
a cam assembly within the aft hub connected with an end of the aft propeller blades; and
a push-rod connecting the cam assembly with an aft end of the actuator, wherein when the actuator moves in a first axial direction, the push-rod moves the cam assembly in the first axial direction to simultaneously decrease the pitch of the forward propeller blades and the pitch of the aft propeller blades, and when the actuator moves in a second axial direction, the push-rod moves the cam assembly in the second axial direction to simultaneously increase the pitch of the forward propeller blades and the pitch of the aft propeller blades.

15. The system of claim 14, wherein the push-rod extends axially from the aft end of the actuator, through the gear train, and connects to the cam assembly.

16. The system of claim 14, wherein the actuator is a nut of a ball screw having a threaded portion that rotates to move the nut in the axial direction.

17. The system of claim 14, the cam assembly comprising:
a slot; and
a cam, which moves in the first axial direction within the slot when the actuator moves in the first axial direction, and moves in the second axial direction within the slot when the actuator moves in the second axial direction.

18. A method of adjusting the pitch of a counter-rotating propeller, the method comprising:
driving a propeller shaft to rotate a forward propeller in a first rotational direction and an aft propeller in a second rotational direction, wherein the forward propeller includes a hub, blades, and an actuator connected with the forward propeller blades and the aft propeller includes a hub, blades, and a cam assembly connected with the aft propeller blades;
moving the actuator in a first axial direction;
moving a cam assembly at an aft end of the actuator in the first axial direction while the actuator moves in the first axial direction to simultaneously decrease the pitch of the blades of the forward propeller and the pitch of the blades of the aft propeller;
moving the actuator in a second axial direction; and
moving the cam assembly in the second axial direction while the actuator moves in the second axial direction to simultaneously increase the pitch of the blades of the forward propeller and the pitch of the blades of the aft propeller.

19. The method of claim 18, wherein the actuator comprises a mechanical actuator or a hydraulic actuator.

20. The method of claim 19, wherein the actuator is a nut of a ball screw having a threaded portion that rotates to move the nut in the first axial direction and the second axial direction.

* * * * *